United States Patent
Maeda et al.

[11] Patent Number: 5,094,318
[45] Date of Patent: Mar. 10, 1992

[54] AUTOMOTIVE SOUND-PROOF MATERIALS AND DAMPING MATERIALS THEREFOR

[75] Inventors: Takashi Maeda; Tsuyoshi Yamashita; Mitsuo Nakamura, all of Wako; Hiroshi Suzuki, Tokyo; Hideo Fujii, Saitama, all of Japan

[73] Assignees: Honda Giken Kogyo K.K.; Nihon Tokushu Toryo Co., Ltd., both of Japan

[21] Appl. No.: 353,873

[22] Filed: May 18, 1989

[30] Foreign Application Priority Data

May 18, 1988 [JP] Japan .................... 63-119232
May 18, 1988 [JP] Japan .................... 63-119233

[51] Int. Cl.⁵ ................................. E04B 1/82
[52] U.S. Cl. .................... 181/290; 181/294; 296/39.3; 428/355
[58] Field of Search ............ 181/290, 294; 296/39.3; 428/265, 355

[56] References Cited

U.S. PATENT DOCUMENTS

| | | | |
|---|---|---|---|
| 4,101,704 | 7/1978 | Hiles | 296/39.3 X |
| 4,456,705 | 6/1984 | McCarthy | 428/355 X |
| 4,488,619 | 12/1984 | O'Neill | 181/290 |
| 4,574,915 | 3/1986 | Gahlau et al. | 181/290 |
| 4,788,099 | 11/1988 | Fukushima et al. | 428/215 |
| 4,800,984 | 1/1989 | Kerman | 181/290 |
| 9,734,323 | 3/1988 | Sato et al. | 181/294 X |

FOREIGN PATENT DOCUMENTS 59-39248 3/1984 Japan .
62-103755 7/1987 Japan .

*Primary Examiner*—Benjamin R. Fuller
*Assistant Examiner*—Alrick Bobb
*Attorney, Agent, or Firm*—King & Schickli

[57] ABSTRACT

A sound-absorption material for an automobile includes a damping material, a sound-absorption material and a surface material. The damping, sound-absorption and surface materials are integrated together. The damping material includes a moldable plastic constraining material and an adhesive damping sheet containing a petroleum resin. The sound-proof material is integrally attachable to an automotive sheet material such as a dashboard.

3 Claims, 1 Drawing Sheet

AUTOMOTIVE SOUND-PROOF MATERIALS AND DAMPING MATERIALS THEREFOR

BACKGROUND THE INVENTION

1. Field of the Invention

The present invention relates to an automotive sound-proof material and a damping material therefore, and is concerned with improvements in or relating to the performance and working properties of such a sound-proof material and a method for the production thereof.

2. Statement of the Prior Art

Heretofore, a sound-proof material has been attached to an automotive dash portion for sound-absorption and -insulation purposes to prevent the entrance of noises from an engine compartment.

A sound-proof material obtained by integrating together a sound-absorption material such as felt and a sound-insulating surface material or by laminating an additional asphalt sheet on the sound-absorption material is used as a sound-proof material for dash, and is applied in such a manner that the sound-absorption material such as felt or the asphalt sheet comes in contact with a dash panel. For instance, Japanese Utility Model Laid-Open Publication No. 59-39248 discloses a sound-proof material formed of a plywood-like three-layer formed silencer comprising a sound-absorption material interposed between and laminated onto a viscous foamed material such as an asphalt foam material and a surface material such as PVC with the use of a bonding agent, said viscous foamed material being closely attached to a dash panel. Japanese Utility Model Laid-Open Publication No. 62-103755 discloses another sound-proof material comprising an asphalt foam material, a sheet formed of PVC, etc., a sound-proof material such as felt and a sheet formed of PVC, etc.

However, it is now desired to achieve further reductions of noises generated in a car engine compartment and so there is an urgent need to provide a sound-proof material having a more improved sound-proof effect at 40° to 60° C., especially while a car is running. From this point-of-view, although the sound-proof material of the structure comprising the asphalt sheet/sound absorption material/surface material is superior to that of a structure including no asphalt sheet, it still fails to produce such a sound-proof effect as now desired.

In order to attach such a sound-proof material using an asphalt sheet to a dashboard, the asphalt sheet is thermally fused to the dashboard on the coating and baking line for automotive bodies and an integral member of a sound-proof material and a surface material is attached to the asphalt sheet. A problem with this sound-proof material is that when it is intended to attach to the dashboard the asphalt sheet (of the integral member of the asphalt sheet/sound-proof material/surface material previously prepared), there is no choice but to use two steps, one step of thermally fusing the asphalt sheet to the dashboard and the other step of attaching an integral member of the sound-absorption material/surface material to the asphalt sheet, due to the thermal deformation of the sound-absorption and sound-insulating materials or other disadvantages.

SUMMARY OF THE INVENTION

A first object of the present invention is to provide an automotive sound-proof material having an improved sound-proof effect even at a temperature as high as, e.g., 40° to 60° C.

A second object of the present invention is to attach the sound-proof material to an automotive dash portion as an integral member at a single step.

A third object of the present invention is to provide a damping material for the sound-proof material so as to attain the first object.

DETAILED DESCRIPTION OF THE INVENTION

The sound-proof material of the present invention is designed to be attached to, for instance, a dashboard of a car which makes a partition between its engine compartment and its passenger compartment, and is formed of an integral arrangement of a damping material comprising a damping sheet 1a and a constraining material 1b, a sound-absorption material 2 and a surface material 3 laminated together on that order, as shown in FIG. 1 by way of example. It is noted that reference numeral 4 denotes a dashboard.

As the above surface material, use may be made of a sound-insulating sheeting material heretofore used. Used to this end are, for instance, sheeting materials obtained by kneading together at least one or two or more of a bituminous material such as straight asphalt, blown asphalt or a mixture thereof, a rubbery material such as styrene-butadiene base synthetic rubber, butyl base rubber and natural rubber and a synthetic resin material with suitable fillers such as calcium carbonate, talc, clay, barium sulfate and mica and forming the kneaded product into a sheet with rolls or extruders.

As the sound-absorption material, use may be made of foamed materials of synthetic resins such as urethane or vinyl chloride or felts, bulky nonwoven fabrics or the like, which comprise one or two or more of animal and vegetable fibers, synthetic resin fibers and mineral fibers.

As the constraining material of the damping material, use is preferably made of formable or otherwise moldable plastics, for instance, polyolefins such as polyethylene and polypropylene, vinyl chloride resins and so on. In order to improve an damping effect at 40° to 60° C., the damping sheet contains a petroleum resin such as one having a melting point of 60° to 180° C. The damping sheet may also contain additional components such as a component comprising polybutadiene, an isocyanate and a catalyst, asphalt, rubber and fillers. These components are rolled into sheets. In order to prepare the damping sheet, the asphalt component heated and melted by heating to, e.g., about 180° C. may be mixed with the filler, etc. in a heated kneader, extruded and then rolled to a thickness of about several millimeters.

Referring to the above constitutional materials, the damping sheet 1a and constraining material 1b are bonded together into the damping material 1 by the adhesion of the damping sheet, the sound-absorption material 2 and surface material 3 are integrally molded by a forming mold, and the constraining material 1b and sound-absorption material 2 are integrally bonded together by means of a bonding agent.

The sound-proof material of the present invention may also be prepared by a method using an injection mold.

More specifically, the above surface material is first placed onto a bottom half of an injection mold, and the above damping material formed into a predetermined shape is then sucked and fixed to the inner face of a top half of the injection mold under reduced pressure (or vacuum). The top and bottom halves are assembled together, and a liquid polyurethane foam material is poured in between the surface damping materials for foaming in conventional manners. Thus, the urethane foam material is bonded as the sound-absorption material to the surface and damping materials, so that they are integrated together.

The polyisocyanate components used may include tolylene diisocyanate (TDI), 4,4-diphenylmethane diisocyanate (MDI), xylene diisocyanate (XDI), 1,5-naphthylene diisocyanate (NDI), hexamethylene diisocyanate (HDI), hydrogenated MDI, isophorone diisocyanate (IPDI), lysine isocyanate (LDI), isopropylidene bis (4-cyclohexyl isocyanate) (IPCI) and other known isocyanates.

The polyols used may include polyether polyols, polyester polyols, polymer polyols, polycarbonate diols and the like.

As the catalysts, use may be made of organic metal compounds such as organic tin compounds and organic lead compounds and amine base compounds such as triethylenediamine, which are preferably used in combination or alone. Particular preference is given to the use of an organic tin compound comprising a tin salt of a carboxylic acid or an organic tin salt and a tertiary amine compound.

As the foaming agents, use may be made of, e.g., trichlorofluoromethane, dichlorofluoromethane, methylene chloride or other halogenated hydrocarbons or water. With the foaming agent, a foam controller such as an organic silane compound may be used.

Other additives such as cross-linking agents, e.g., diethanolamine and triethanolamine, fire-retarding agents, coloring agents and stabilizers may be used.

The sound-proof material prepared as mentioned above may be attached to, e.g., a dashboard due to the adhesion of the damping sheet by pressing the damping sheet against the dashboard by, e.g., manual operation on the assembly line of automotive production lines. Such operation may be carried out at normal or ambient temperature.

With the sound-proof material attached to the dashboard of a car in this manner, it can produce an improved sound-proof effect upon noises generated from the engine compartment through its damping, sound-absorption and sound-insulation actions, thereby achieving an improved sound-proof effect upon noises generated even at 40° to 60° C. while the car is running.

ACTION AND EFFECT OF THE INVENTION

According to the present invention, since the damping material is formed of the damping sheet and the constraining material and the petroleum resin is contained in the, damping sheet to improve a damping effect at 40°0 to 60° C., the sound-proof material can be attached to the dash portion of an automobile by bonding the damping sheet with its adhesion to the dashboard at normal temperature, whereby the conventional two steps of attaching an asphalt sheet and then another member in place can be reduced to one step to improve the efficiency of production.

The constraining layer is provided to improve the damping effect of the damping sheet, thereby achieving further improvements in the sound-proof effect.

EXAMPLES

Figure 1:
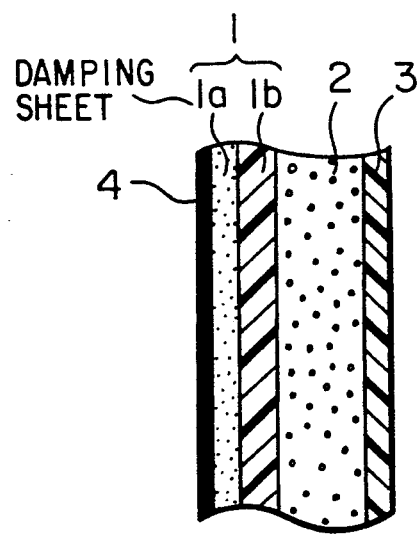
FIG. 1 is a sectional view of the sound-proof material of the present invention.

The present invention will now be explained specifically but not exclusively with reference to FIGS. 1 and 2.

Example 1—Sound-Proof Material and Damping Material

Kneaded together are 10 parts by weight of asphalt (straight asphalt:blown asphalt =55:45), 10 parts by weight of butyl base rubber, 5 parts by weight of EVA (an ethylene/vinyl acetate copolymer), 65 parts by weight of calcium carbonate and 10 parts by weight of process oil to prepare a surface material 3 of 2.5 mm in thickness.

After the surface material 3 is placed on a bottom half of an injection mold, a liquid urethane foam material comprising 100 parts by weight of polyether polyol, 2 parts by weight of an amine base cross-linking agent, 1 part by weight of an amine base catalyst, 2 parts by weight of a foam controller, 2 parts by weight of a foaming agent and 30 parts by weight of crude isocyanates MDI/TDI (20:80) was poured and foamed in the injection mold to integrate an sound-absorption material 2 of 20 mm in thickness with the surface material 3.

A damping material 1 is prepared by integrating an 1-mm thick constraining material 1b formed of a vinyl chloride sheet with a damping sheet 1a obtained by kneading together 45 parts by weight of blown asphalt, 35 parts by weight of petroleum resin (with a melting point of 120° C. ), 20 parts by weight of polybutadiene and 2 parts by weight of MDI through the adhesion of the damping sheet.

The constraining material 1b of the above damping material and the sound-absorption material 2 are put upon each other through an adhesive layer and bonded together under pressure to prepare a sound-proof material. This sound-proof material was bonded as a test sample to a 0.8-mm thick steel sheet equivalent to an automotive dashboard to measure its sound-proof effect. The results are shown by a solid line in FIG. 2.

The sound-proof effect tests were carried out with a testing unit designed to strike about 200 metallic balls against a steel plate of 0.8 mm in thickness, thereby making noises similar to those generated when an actual automobile is running. The noise level ($TL_0$) of the steel plate was first measured at 100 to 5,000 Hz, and the noise level ($TL_1$) of the steel plate, to which the sound-proof materials according to the example and comparison example were attached in the same manner as mentioned above, was then similarly measured. Per each frequency region, the sound-proof effect expressed in terms of $\Delta TL = TL_0 - TL_1$ was calculated for plotting. Such measurement was carried out at a temperature of 40° C.

A damping effect test was also carried out with the damping material 1, while its weight was measured. The results are tabulated in a table to be given later.

The damping effect and weight of the damping material 1 were measured as follows.

Damping Effect Test

According to the procedures described in "Noise Control Handbook", published on Dec. 25, 1966 by the Japan Acoustic Material Association, page 438, the resonance frequency and half value width were measured by the resonance method and the loss factor η was calculated along the procedures described in the above literature. It is noted that the higher the loss factor η, the higher the damping effect, and that the lower limit of η judged practically effective for damping is 0.05.

Referring briefly to the testing method along the testing procedures described in the above literature, the damping material as obtained above was pressed against or thermally fused to a 0.8×20×200 mm steel sheet at 150° C. for 30 minutes, and its portion forced out thereof was cut out by a knife, etc. Ten test pieces were prepared and measured at 40° C. with the resulting measurements being expressed in terms of the average.

Weight Measurement

Ten 200×200×2 mm damping materials were prepared to measure their surface densities (Kg/m²) on a platform scale, which were then averaged out.

Comparison Example 1—Sound-Proof Material

A 2.5-mm thick asphalt sheet formed of a bituminous material was bonded to a 0.8-mm thick steel sheet equivalent to an automotive dashboard by heating through the adhesion of asphalt. Afterwards, a member formed integrally of a 2.5-mm thick surface material 3 and a 20-mm thick sound-absorption material 2 in a similar manner as in Ex. 1 was placed on the asphalt sheet to prepare a sample including a sound-proof material of the asphalt sheet - sound-proof material 2 - surface material 3 on the above steel sheet.

The sound-proof effects of the sound-proof materials according to the above example and comparison example were measured. The results are plotted by solid and dotted lines.

Comparison Example 2—Damping Material

Fifty (50) parts by weight of asphalt (straight asphalt:blown asphalt=55:45), 2 parts by weight of styrene-butadiene rubber, 20 parts by weight of calcium carbonate, 20 parts by talc and 18 parts by weight of asbestos were kneaded together at 120° C. in a heated kneader, extruded and rolled into a damping material having a thickness of 2.0 mm.

That damping material was tested in a similar manner as described in connection with the damping material of Ex. 1. The results, are set out just below.

|  | Example | Comparison Example |
|---|---|---|
| Loss Factor η | 0.27 | 0.08 |
| Weight | 2.5 Kg/m² | 3.0 Kg/m² |

Figure 2:
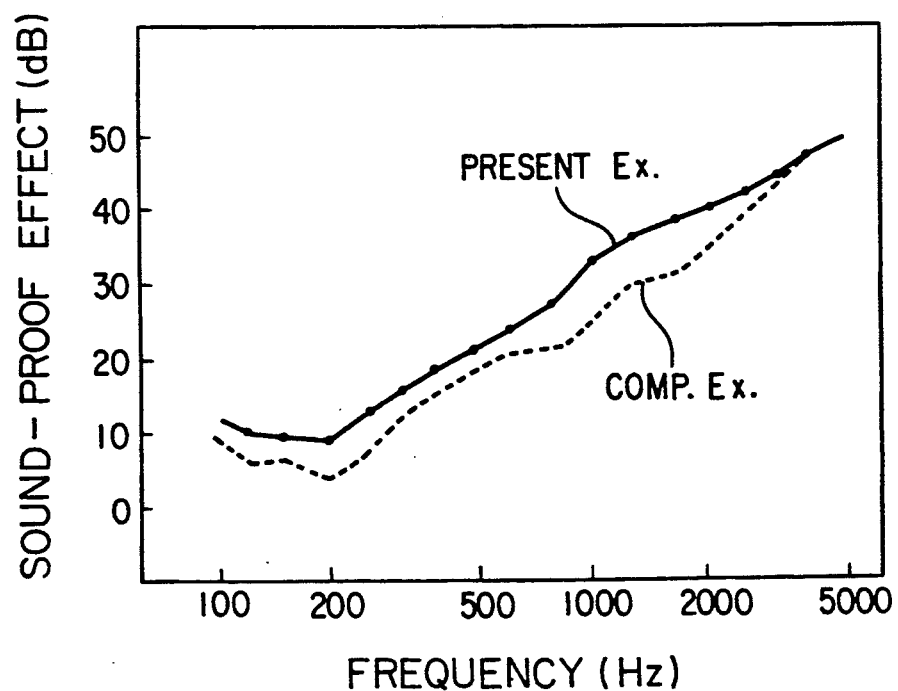
FIG. 2 is a graphical view showing the results of tests performed in terms of the sound-proof effect of that material.

From the results of the above example and comparison example shown in FIG. 2, it is found that the sound-proof material according to the present example is superior to that according to the comparison example. From the table given just above, it is appreciated that the damping material according to the present invention decreases in weight, although its damping effect is improved.

What is claimed is:

1. An automotive sound-proof material comprising a damping material, a sound-absorption material and a surface material, wherein:
    said damping, sound absorption and surface materials are integrated together;
    said damping material including a plastic constraining material, moldable at ambient temperature, selected from a group consisting of polyolefins and vinyl chloride resins and an adhesive damping sheet also moldable at ambient temperature and formed from materials selected from a group consisting of asphalt, petroleum resin, polybutadiene, isocyanate, rubber, filler and mixtures thereof effective in forming said damping sheet;
    said sound absorption material selected from a group consisting of foamed synthetic resins, felts, non-woven fabrics, synthetic resin fibers and mineral fibers;
    said surface material, moldable at ambient temperature, being formed into a sheet from at least one or more materials selected from a group consisting of straight asphalt, blown asphalt, a mixture of straight and blown asphalt, a rubbery material selected from a group consisting of styrene-butadiene base synthetic rubber, butyl base rubber, natural rubber and any mixtures thereof, and a synthetic resin material with suitable fillers selected from a group consisting of calcium carbonate, talc, clay, barium sulfate, mica and mixtures thereof;
    whereby said sound-proof material is integrally attachable to an automotive sheet material at ambient temperature.

2. An automotive sound-proof material as claimed in claim 1, wherein said petroleum resin has a melting point of 60° C. to 180° C.

3. An automotive sound-proof material as claimed in claim 2, wherein said automotive sheet material is a dashboard.

* * * * *